May 22, 1923. 1,456,135
K. F. LIDHOLM ET AL
FUEL MIXER
Filed Aug. 16, 1920
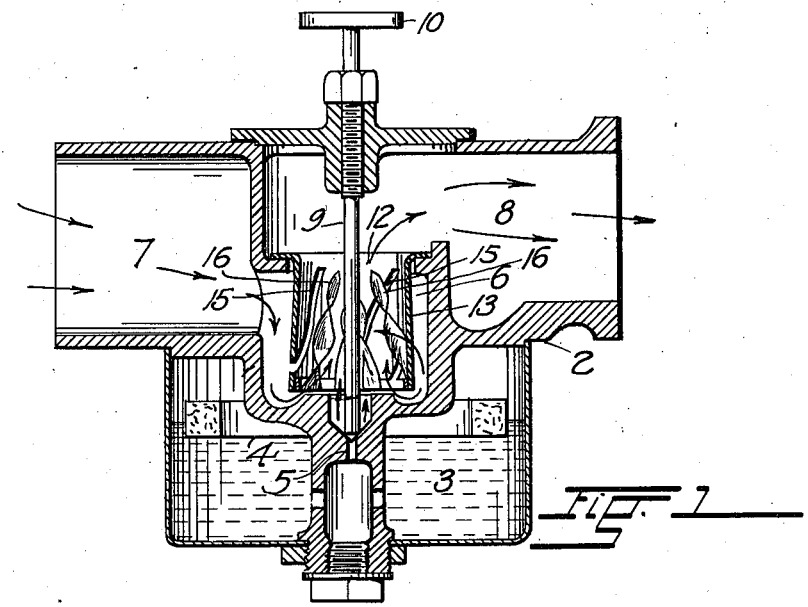
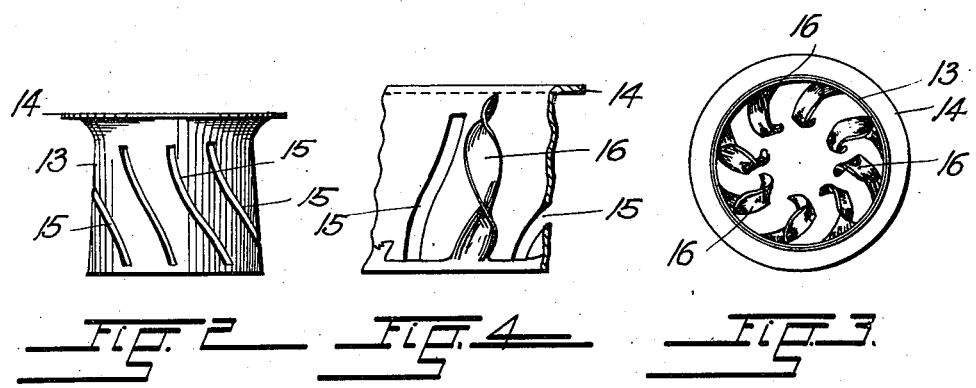
INVENTORS
K. F. LIDHOLM AND
A. E. HEDWALL.
BY
ATTORNEY.
WITNESS:

Patented May 22, 1923.

1,456,135

UNITED STATES PATENT OFFICE.

KNUT F. LIDHOLM AND ADOLPH E. HEDWALL, OF DENVER, COLORADO.

FUEL MIXER.

Application filed August 16, 1920. Serial No. 403,702.

*To all whom it may concern:*

Be it known that we, KNUT F. LIDHOLM and ADOLPH E. HEDWALL, citizens of the United States, residing at Denver, in the county of Denver and State of Colorado, have invented certain new and useful Improvements in Fuel Mixers, of which the following is a specification.

This invention relates to improvements in fuel mixers for internal combustion engines and its primary object is to provide certain new and useful improvements in fuel mixers which effect an intimate intermixture and complete dissemination of the gasoline and air and thereby increase the efficiency of the engine to which it is applied.

In carbureters of this character as at present constructed, the mixing chamber in which the air and fuel intermingle into an explosive mixture before passing into the intake manifold of the engine, is formed by an upright, flanged tube which is suspended above the outlet of the float chamber inside a space which is in direct connection with the air intake. The air entering the mixing chamber at the lower end of its tubular wall, meets the gasoline escaping from the float chamber and the mixture thus produced passes through the upper end of the tube into the intake manifold of the engine.

The improvements of the present invention consist in providing the wall of a mixing chamber of the character above referred to, with a number of longitudinally extending spirally shaped slots through which the air may enter, and in forming interiorly of said wall opposite to the spaces between the slots helically twisted blades which converge from the lower portion of the tube and terminate adjacent the upper end thereof.

The gasoline drawn into the mixing chamber by suction of the engine, meet the air entering through the spiral slots and the two currents upon striking the twisted blades, intermingle in a whirling motion resulting in a vortex which before entering the intake manifold, produces an intimate intermixture of the air and gasolene and a complete disruption and dissemination of the moisture globules.

In the accompanying drawings in the various views of which like parts are similarly designated, we have shown our invention applied to a carbureter of the type used on Ford automobiles, Figure 1 representing a vertical section through a carburetor, to which our invention is applied.

Figure 2 an elevation of the attachment which in practice forms the mixing chamber of the carburetor.

Figure 3 a top view of the part shown in Figure 2, and

Figure 4 a fragmentary enlarged inside view of the attachment showing one of the twisted blades thereof in elevation.

The reference character 2 designates a carbureter of the type hereinbefore referred to, including the usual float chamber 3 in which a float 4 controls the liquid level by connection with an intake valve. The float chamber has an outlet 5 for gasolene into a superposed space 6 which is in direct connection with an air intake opening 7 and which at its upper end connects with a passage 8 connected to the intake manifold of the engine. A needle valve at the end of a stem 9 extending through a threaded opening at the top of the carbureter, controls the passage of gasolene through the outlet opening of the float chamber and has at the upper end of its stem a hand wheel 10 to facilitate its adjustment.

The mixing chamber 12 of the carbureter is provided by a tube 13 which at its upper end has an outwardly turned flange 14 for its suspension inside the space 6 of the carbureter with which the air intake and the outlet of the float chamber are in direct communication.

The tube 13 which is separated from the wall of the space, is of slightly tapering form to facilitate the entrance of air through its longitudinal slots 15 which as stated hereinbefore are made of spiral form. The helically twisted blades 16 converge interiorly of the tube from the lower portion thereof, and they are positioned opposite to the spaces between the slots so as to not obstruct the entrance of the air.

In the operation of the carbureter the air enters the mixing chamber through the slots in the wall of the tube 13 and partially at the lower end of the same, and the gasoline passing through the outlet opening of the float chamber enters the mixing chamber in an upwardly directed current. The direction given to the entering air currents by the spiral shape of the slots 15, and the position of the twisted blades inside the tube produce a vortex as hereinbefore explained, which causes the intimate intermixture of the air and gasoline and the dissemination of the liquid particles of the same, necessary to produce an explosive mixture of the high degree of combustibility required for the operation of the engine at or near its point of greatest efficiency.

It will be understood without further illustration that our improvements may be applied with equal results to carbureters of types differing from that shown in the drawings and herein described, and that the attachment may be used at any other point in the course of fuel to the cylinders of an internal combustion engine where a thorough intermixture of the constituents of the fuel is desirable.

What we claim and desire to secure by Letters Patent is:

1. A fuel mixer for internal combustion engines comprising an open-ended duct having a plurality of spirally twisted blades extending convergingly inwardly from its wall.

2. A fuel mixer for internal combustion engines comprising a tapering open-ended duct having a plurality of spirally twisted blades extending convergingly inwardly from its wall to adjacent its small end.

3. A fuel mixer for internal combustion engines comprising an open-ended duct having longitudinal slots and spirally twisted blades extending convergingly inwardly from an end of said slots.

In testimony whereof we have affixed our signatures.

KNUT F. LIDHOLM.
ADOLPH E. HEDWALL.